Dec. 5, 1944.    J. C. MORRELL    2,364,234
CONTAINER AND METHODS OF MAKING THE SAME
Filed Aug. 12, 1942
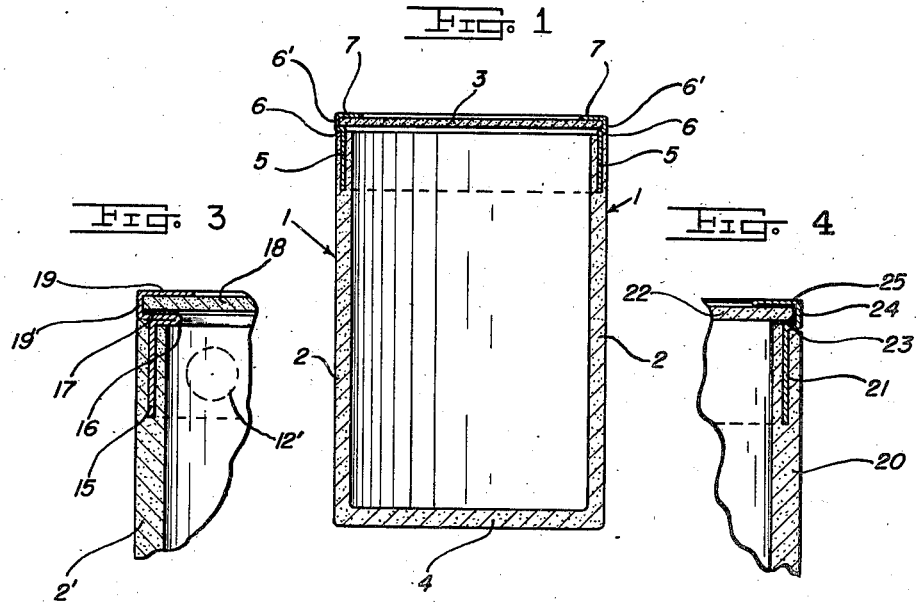
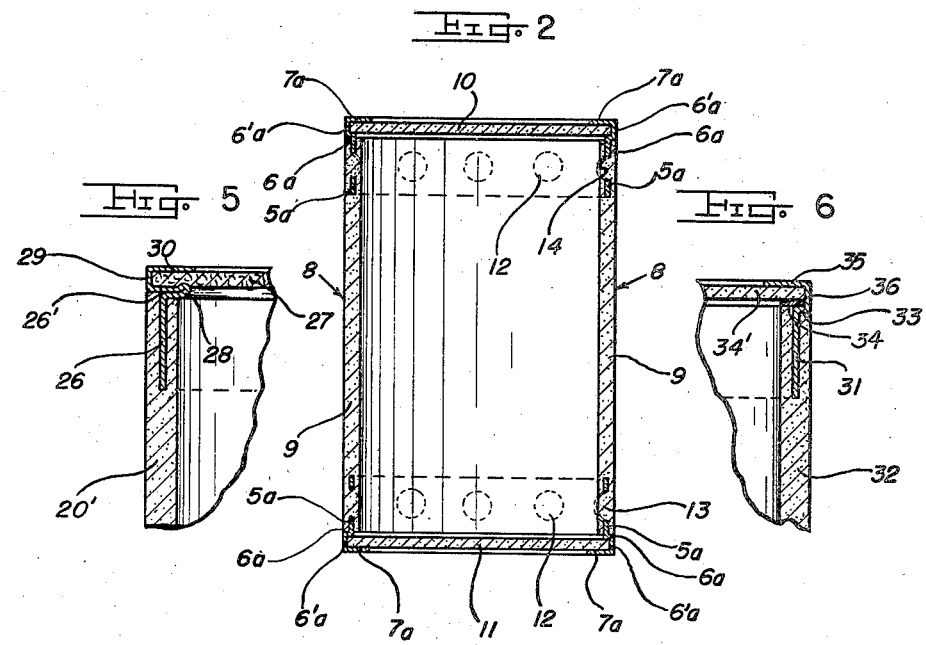
Inventor
Jacque C. Morrell Patented Dec. 5, 1944

2,364,234

UNITED STATES PATENT OFFICE 2,364,234

CONTAINER AND METHOD OF MAKING THE SAME

Jacque C. Morrell, Chevy Chase, Md.

Application August 12, 1942, Serial No. 454,597

4 Claims. (Cl. 229—5.7)

This application is a continuation-in-part of my applications Serial Nos. 432,480, filed February 26, 1942, and 409,327, filed September 2, 1941.

The invention relates to improvements in receptacles or containers and processes of making the same and refers particularly to receptacles, containers or cans for packaging solids, or liquids, or mixtures of the same, such as foodstuffs and perishables generally.

In the general embodiment of my invention the process comprises making a container of a synthetic resin or plastic material. In one aspect the container has a lateral wall with collars preferably of metal embedded in the thickness of the said wall and projecting from the opposite ends of the wall and securing the top and bottom of the container by the thus embedded collars. In another aspect the bottom of the container may be integral with the embedded collar and in still another modification the container is made up of a synthetic resin or plastic material and may have a bottom integral with the walls of the same and made of the same material as the lateral wall. As one of the special features of the present invention the tops and/or bottoms of the container are non-metal in composition and may be made of the same material as the body, namely, a plastic material or a mixture of plastic and fibrous materials or other fillers.

Molding or extrusion may be employed with mixtures containing synthetic or other resins or plastic materials and fillers, preferably of a fibrous character as hereinafter described and may be applied to all shapes and forms, e. g., the cylinder or body of the container per se may be molded with the metal collars or ends in place or providing annular slots for the same, e. g., may employ molding mixtures containing synthetic or other resinous or plastic materials and fillers such as wood flour, mineral matter, etc., preferably employing fibrous materials such as paper fibers or pulp, cotton, jute, ramie, hemp and other natural fibers, artificial fibers such as rayon, mineral fibers such as asbestos and fibrous materials generally in admixture with the various plastic or resinous materials already mentioned, the preparations of fibrous and resinous materials being somewhat conventional, e. g., as one typical example may be mentioned. 45 percent synthetic resin, 4 percent hardening agent, 1 percent lubricant, 0.5 percent dye or pigment, 48 percent long fiber asbestos. This, however, may vary to a fairly wide degree.

These mixtures are molded by means well known to the art into cylindrical or other shapes with the metal collars or ends placed in position and sealed in the wall thickness and with sufficient protrusion from the body to provide attaching means for the tops and bottoms.

Referring to the drawing:

Fig. 1 is a sectional elevational view of my improved container;

Fig. 2 is a sectional elevational view of a modification of my container;

Fig. 3 is a fragmentary sectional elevation of another modification of the container and of the means for securing the top;

Fig. 4 is a fragmentary sectional elevational view of a modification of the container and means for securing the top and/or bottom thereof;

Fig. 5 is a fragmentary sectional elevational view of still another modification of the container with particular reference to means of securing the top and/or bottom thereto, and Fig. 6 is a fragmentary sectional elevational view of the container showing another modification of the means of securing the top and/or bottom thereto and sealing the same.

Referring in detail to the drawing in Figure 1, 1 indicates a container of the cylindrical type which may be made by molding or extrusion or by winding a web of fibrous material such as paper impregnated with a plastic or adhesive material having cylinder walls 2, top 3 and bottom 4 which is integral with the walls of the container and may be made generally of the same material. As a feature of my invention, the cylindrical lateral walls 2 of the container 1 and in general the body of the container, may be made of a mixture of synthetic resinous or generally plastic materials alone or with a filler preferably of a fibrous character or in a nonequivalent modification of a plastic material, e. g., thermoplastic synthetic resin without a filler. In the latter case the body of the container may be made by injection molding. Preferably, where the filler is employed a thermo-setting synthetic resin is employed although the thermoplastic synthetic resin or plastic may also be employed with a filler. The top 3 is generally a disc preferably made of non-metal material such as plastic and as fibrous material, e. g., the same or similar materials as the wall of the container by crimping or bending the projecting end of the embedded cylindrical collar 5 around the periphery or edges of the disc. This projecting portion of the collar forms a flared flange 6 on which the top 3 rests and a reverse flange 7 which secures the top 3 connected and spaced apart by an upstanding or vertical flange 6' which extends around the periphery of the top 3. The inside surface of the flange 6, 6' and 7 (the last being a reverse flange) thus formed and which secures the top 3 to the body of the container may be coated with a sealing material such as a rubber compound or other suitable plastic material. The sealing material between the flared flange 6 and the top (or bottom where shown) of the container may take the form of a gasket or other suitable form.

Referring to Fig. 2, 8 is a container of the cylindrical type with lateral walls 9 made, e. g., of a plastic material, e. g., a synthetic resin with or without filler, of molded extruded or laminated construction, as described in connection with Fig. 1. The top 10 may be of the same material as the walls or, e. g., of an impregnated fibrous cardboard and bottom 11 may also be of the same or similar material.

The top 10 and bottom 11 at each end of the container is secured in substantially the same manner as described in connection with Fig. 1, i. e., collar 5a, flared flange 6a, vertical flange 6'a and reverse or securing flange 7a, except that the embedded portions of the collar structure is provided with open ports 12 through which the plastic material of the cylindrical body 13 and 14 is forced, thereby permitting a more secure and integral arrangement of the embedded collar in respect to the container body.

Fig. 3 shows a fragmentary sectional view of a variation of the invention with body 2' the metallic collar 15 rolled inward forming a reverse flange 16 which provides a larger surface area for supporting the gasket or sealing member 17. The lid or closing member 18 is secured in place by the retaining outwardly flared flange 19 of collar 15 with part 12' which is connected by the vertical upward flange 19'. This compound flange extends around the periphery and over the top surface of the closing member.

Fig. 4 shows a fragmentary sectional view of another variation of the invention with the top of the cylindrical body of the container 20 extended to the same plane as the surface of the outward flare of the metallic collar 21 to form a resting or retaining flange for the closing member 22. The retaining outwardly flared flange is separated from the closing member 22 by sealing compound 23, and is connected by upwardly extending flange 24 to reverse or securing flange 25 which secures the top of the container.

Fig. 5 shows a fragmentary sectional view of my invention with container body 20' and metallic collar 26 flared inwardly to form a supporting flange 26' for the closing member 27. Along the endward extremity of the said flared flange it is rolled upwardly to form a sealing ridge 28 made for pressing into the closing member 27 as the retaining flange 30 is crimped into place. The flared flange 26 is connected to retaining flange 30 by upwardly extending or vertical flange 29.

Fig. 6 is a fragmentary sectional view of a variation of the invention with the container wall 32 extended on the inner side to form a flange horizontal and on the same level to the outward flaring flange 33 of the collar member 31 on which rests sealing ring 34. The sealing ring seals the container with the cover or top member 34' when the retaining or securing flange 35 is crimped into place. Flared flange 33 is connected by vertical flange 36 with the retaining flange 35.

In all cases the element referred to as a flared flange may be also referred to as an outwardly extending flange and the retaining flange as an inwardly extending flange. The vertical flange connecting these two may be termed an upwardly extending flange.

The fragmentary sectional views showing the top of the container may also represent the bottom.

With reference to the collars, they may be of a single piece of metal or joined by a crimped, curled or plain lap seam. The flanges may be shaped before or after embedding the collar in the walls of the container. In some cases the bottom may be integral with the bottom collar.

These metal collars or ends may also be adapted to be opened like the usual "self opening" cans which have a relatively narrow strip integral with the metal collar or cylindrical portion or sides of the can at a point beneath the top or lid. In this case the strip would extend sufficiently out of the wall of the laminated body of the container to permit an outlining of the strip along its edges by lines which cut the surface of the metal and weaken the same so that the strip may be torn or sheared therefrom thus opening the can by removing the top and upper portion of the cylindrical side wall. It is not desired to claim any particular design of tearing strip but merely to point out that it may be adapted to this new form of can or container.

Briefly describing one aspect of the process in which the walls are laminated, a solution is made up of the resin or other plastic materials, preferably formed by reacting phenol or cresols or mixtures of the same with formaldehyde or employing the urea formaldehyde type of resin and dissolving the said resins in ethyl alcohol or acetone or other suitable solvent to make up a solution of a substantial concentration, which will permit saturation of the paper or fabric passed therethrough or immersed therein. These resins may be prepared with suitable catalysts to permit conversion of the same into the insoluble, infusible form after the body of the container has been formed. The fabric preferably comprising a continuous sheet of heavy unsized paper, e. g., of the kraft type, is passed continuously through a bath of the solution of resin guiding the same through the liquid and maintaining it submerged by rolls. The solvent is then removed as described, e. g., by passing through a heated zone preferably with a stream of heated gas and preferably recovered. The dried or partially dried paper, preferably of the same approximate width as the length of the container, saturated with resin is rolled over a cylindrical form until approximately one-half of the layers comprising the finished wall thickness have been applied. The metallic collars, to which the top and bottom of the container are to be secured, may then be put in position by placing the same over the ends of the roll of paper, saturated with resin or other plastic and permitting a small portion of the collar to protrude to permit attachment of the top and bottom of the container—preferably the protruding ends or top only when the bottom and collar are integral, are shaped to permit attachment of the lid in the manner described. The sides of the metallic collars (except where the bottom is integral therewith) may if desired be split or partially closed by crimping to permit proper adjustment when the walls of the resin-fabric container are subjected to pressure and then later sealed by soldering or in a manner which is well known and conventional in the present art of making metallic cans or the sides of the collars may be crimped and soldered prior to insertion in the resin-paper fabric walls of the container. The resin saturated paper is then wound or rolled over the metallic ends to complete the wall thickness of the container, which is consolidated by rolling simultaneously converting in part the fusible, soluble resin into infusible, insoluble type and embedding the metal ends. If the resin is not converted sufficiently at this stage it may be heated subsequently to convert the fusible resin to the infusible form. However, it must be understood that I may employ thermoplastic materials in this aspect of my invention.

After curing or converting in the manner described and in some cases prior to this operation, depending upon materials used, the method of manufacture employed and the results desired, certain finishing or trimming operations may be carried out; for example in finishing the surfaces and trimming the edges of the laminated composition of which the container is made, machining or grinding operations may be employed. One method of carrying this out is the use of the so-called centerless grinder for finishing the outer and inner surfaces simultaneously. These operations may however be accomplished in any well known or desirable manner.

The preferred plastics or synthetic resins as described are those of the phenol formaldehyde (including also cresols, xylenols, etc.), or urea formaldehyde types, which form infusible and insoluble resins on heat treatment. Other types of resin may however be employed, among which are the alkyl resins (glyptals made from polybasic acids such as phthalic and maleic acids and polyhydric alcohol, such as glycerol, glycols, etc.), styrene resins, e. g. the polystyrene types, acrylic or acrylate resins, e. g., methacrylate, the vinyl or vinylite polymer which may include acetate, halides, polyvinyl alcohols plus aldehydes, etc. Resins with accompanying plasticizers if needed, such as tricresyl phthalates, etc., may be employed.

Regarding the types of fabrics or textiles which may be used in general it may be said that paper is preferred, particularly the unsized, for example that made by the kraft or sulphate method, but other methods may be employed such as the sulphite and those well known to the paper art. In paper-making any vegetable substance which possesses a sufficiently fibrous structure can be utilized and this may in the same way be applied to the present invention.

Having described specific methods of fabricating the receptacles or containers particularly in cylindrical form, it is quite obvious that the same methods may be adapted to other shapes and forms, for example of square or rectangular or other cross-section or shape. Various methods of winding or rolling the paper web or fabric in making the laminated forms may be employed, for example, straight or diagonal and various types of papers, cardboards, etc., may be used as previously referred to, the unsized paper being preferred. Also the various combinations of the specific methods described may be employed as well as variations which might be obvious to one skilled in the art after a study of the above methods.

The thermosetting synthetic resins used herein described are those of the phenol formaldehyde, (including also cresols, xylenols, etc.), or urea-aldehyde types, which form infusible and insoluble resins on heat treatment. These are preferred when fillers are employed. The thermoplastic types of synthetic resins and plastics may, however, be and are preferably employed when fillers are not used although it is to be understood that they may also be used with fillers.

Among the thermoplastic synthetic resins are the alkyd resins (glyptals made from polybasic acids such as phthalic and maleic acids and polyhydric alcohol, such as glycerols, glycols, etc.), styrene resins, e. g., the polystyrene types, acrylic or acrylate resins, e. g., methacrylate, the vinyl or vinylite polymer which may include acetate, halides, polyvinyl alcohols plus aldehydes, etc. Resins with accompanying plasticizers if needed, such as tricresyl phthalates, etc., may be employed. Also the thermoplastics of the cellulose derivative type may be used in some cases, e. g., cellulose acetate and cellulose nitrate types, mixed esters such as cellulose acetate-butyrate, ethyl cellulose and similar materials. Various rubber or rubber like compositions may be used although not equivalent to the other plastics including synthetic rubbers, duprene, neoprene, thiokol, chlorinated rubber, and the like.

A regrouping of the above types of thermoplastic synthetic resins might be shown as (a) styrenes, (b) vinyl resins, (c) alkyds, (d) acrylates.

The acrylate resins as well as the polystyrenes and vinyls are all characterized by the unsaturated radical $HC_2=CH-$ known as the vinyl radical, and in one sense therefore the three types belong to one large family, which may be referred to as the vinyl thermoplastic synthetic resins and may also include divinyl types, and serves to define the entire group.

A recently developed type of thermoplastic synthetic resin which it is contemplated employing in connection with the present invention and which may be considered a vinyl derivative and in the vinyl group is the polymerized vinylidene chloride resin.

The solvents which may be employed with these materials comprise generally the alcohols, ethers, ketones, aldehydes, esters or mixtures, in general relatively low boiling; also various hydrocarbons and derivatives.

Resins with accompanying plasticizers such as tricresyl and homologous phthalates and dibutyl and homologous phthalates and the like may be employed for sealing the top.

It is also to be understood that I may use various coloring materials in connection with the various synthetic resins or plastics and these may be selected in accordance with well known practice for the selection of coloring materials which are compatible with various plastics. Also in connection with the use of solvents where these are employed with the thermoplastic synthetic resins to autogenously seal the tops into the body of the container, selections of solvents will be made in accordance with the resins employed, for example, the vinyl chloride resins are soluble in ketones and esters. The methacrylate resins are soluble in ketones, esters and aromatic hydrocarbons and the styrene resins are soluble in aromatic and chlorinated hydrocarbons.

Several methods of forming have already been referred to and in general the methods employed are compression molding, injection molding and extrusion. These in general may be referred to as forming by compression. The metal collars may be placed in the mold and sealed into the walls of the container during the molding operation.

While I have described a number of modifications and forms of my invention it is to be understood that the specific examples in respect of materials and details of process are given for illustrative purposes only and that many non-equivalent combinations may be employed within the broad spirit and scope of my invention.

I claim:

1. A cylindrical container having a lateral wall, a top and a bottom comprising the end closures of said container, said wall being constructed of a laminated fibrous base impregnated with a binder, the opposite ends of said wall having a metal collar embedded therein in interlocking relation therewith and projecting therefrom, said top and bottom being secured to the free ends of said respective collars by means of a flanged portion of said collars consisting of a horizontally flared flange extending outwardly, a vertical flange extending upwardly and a reverse flange extending over and retaining the said closure, said flanged portion being positioned beyond the adjacent end of the wall in non-embracing relation with respect to said wall with the flared flange extending substantially in the plane of the end edge of said wall, the binder in said wall functioning to seal said collars in said wall and said collars being held to said wall substantially solely by the embedded ends of the said collars.

2. A cylindrical container having a lateral wall, a top and a bottom comprising the closures of said container, said wall comprising a plastic material and having a cylindrical metal collar embedded in at least one end of the said wall of the container and projecting therefrom, at least one closure being secured to the free end of said collar by means of a flared peripheral flange extending outwardly forming a continuous flat shoulder and a reverse flange extending over the said closure providing a recess to receive and to clamp the said closure against the shoulder in sealing engagement therewith and thereby sealing the said container, the said flanges being integral with the said collar, the said plastic in said wall functioning to seal the said collar along its entire periphery in said wall whereby the said collar together with its integral flanges and retained closure is secured substantially solely by the embedded end of the said collar.

3. A cylindrical container having a lateral wall, a top and a bottom comprising the closures of said container, said wall comprising a filler material and a binder and having a cylindrical metal collar embedded in at least one end of the said wall of the container and projecting therefrom, at least one closure being secured to the free end of said collar by means of a horizontally flared peripheral flange extending outwardly to form a continuous shoulder and a reverse flange extending over the said closure providing a recess to receive and to clamp the said closure against the shoulder in sealing engagement therewith and to seal the said container, the said flanges being integral with the said collar, the said binder in said wall functioning to seal the said collar along its entire periphery in said wall whereby the said collar together with its integral flanges and retained closure is secured substantially solely by the embedded end of the said collar.

4. A cylindrical container having a lateral wall, a top and a bottom comprising the closures of said container, said wall comprising a fibrous material and a binder and having a cylindrical metal collar embedded in at least one end of the said wall of the container and projecting therefrom, at least one closure being secured to the free end of said collar by means of a horizontally flared peripheral flange extending outwardly to form a shoulder and a reverse flange extending over the said closure providing a recess to receive and to clamp the said closure against the shoulder in sealing engagement therewith and thereby sealing the said container, the said flanges being integral with the said collar, the said binder in said wall functioning to seal the said collar along its entire periphery in said wall whereby the said collar together with its integral flanges and retained closure is secured substantially solely by the embedded end of the said collar.

JACQUE C. MORRELL.